UNITED STATES PATENT OFFICE.

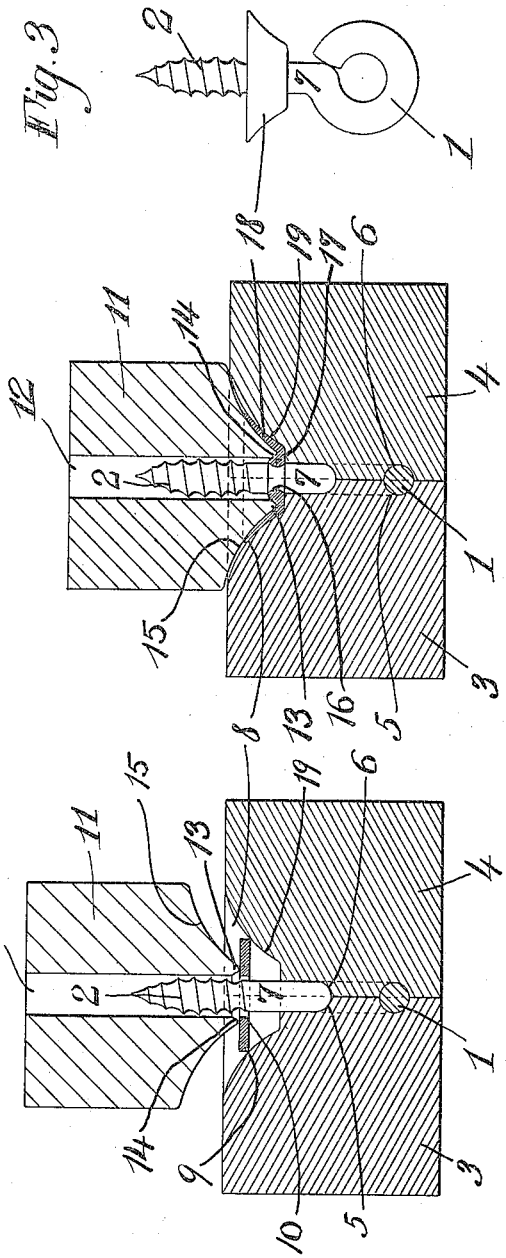

FREDERICK E. WARNER, OF BRIDGEPORT, CONNECTICUT, ASSIGNOR TO THE WARNER BROTHERS COMPANY, OF BRIDGEPORT, CONNECTICUT, A CORPORATION OF CONNECTICUT.

METHOD OF MAKING SCREW HOOKS, EYES, &c.

1,145,637. Specification of Letters Patent. Patented July 6, 1915.

Original application filed July 17, 1914, Serial No. 851,431. Divided and this application filed October 28, 1914. Serial No. 868,942.

*To all whom it may concern:*

Be it known that I, FREDERICK E. WARNER, a citizen of the United States of America, and a resident of Bridgeport, Fairfield county, State of Connecticut, have invented certain new and useful Improvements in Methods of Making Screw Hooks, Eyes, &c., of which the following is a specification.

This invention relates to a method of making screw hooks, eyes, etc., having positioned on the stem thereof a gage or stop collar of suitable formation, such as described and illustrated in my copending application Serial No. 851,431, filed July 17, 1914.

More particularly the invention comprises the step of affixing a disk-like gage or stop collar at a predetermined point on the stem of the screw hook, eye, etc. by swaging or otherwise combinedly compressing in a suitable die or other machine to thereby form a groove at such predetermined point on the stem and a ring-shaped portion on the gage or stop collar protruding within such groove.

My invention may be carried out in one form thereof by positioning the screw hook, eye, etc. in a die block forming the female die and slipping the disk over the threaded end of the screw hook, eye, etc., and then applying proper compressional forces by means of a male die to simultaneously form the desired groove on the stem of the screw hook, eye, etc., at the predetermined point and the ring-like portion on the disk protruding into said groove. It is preferable in such operation to employ a cylindrical disk and shape such cylindrical disk into the desired final form, such as cup shaped, during the procedure of forming the groove and ring connection.

Other features and objects will be more fully understood from the following description and accompanying drawings, in which—

Figure 1 illustrates one procedure in carrying out my invention by means of male and female dies, the positions of the parts indicating the stage previous to applying compressional forces; Fig. 2 illustrates the same at the stage subsequent to applying the compressional forces; and Fig. 3 shows a screw eye having a cup shaped gage or stop collar applied thereto in accordance with the procedure indicated by Figs. 1 and 2.

Referring to the drawings, the specific illustration of my invention shows the manner of forming a cup shaped gage or stop collar onto the stem of a screw eye at a predetermined point. In this instance, the screw eye 1 is provided with a roll-threaded end 2. The female die block comprises the separable parts 3, 4, having conjoint grooves 5, 6, for receiving the eye portion of the screw eye 1 and retaining the same within so that the stem 7 of screw eye 1 projects upwardly through the opening 8 of the female die block 3, 4. In this case, the cylindrical disk 9 is used from which to form the desired cup shaped stop or collar. The opening 10 of disk 9 is of relatively large cross section in proportion to the cross section of the stem 7 of screw eye 1. Accordingly, it will be clear that my invention is particularly adaptable for screw eyes, screw hooks, etc., which are provided with a roll-thread, the maximum cross section of such roll-thread being considerably greater than the cross section of stem 7 of the screw eye, hook, etc.

The male die block is provided with the central opening 12 to receive the screw-threaded end 2 of the screw eye 1. The face of the male block 11 comprises the ring-shaped portion 13, positioned considerably outwardly with respect to the contour of opening 12, the inwardly extending face portion 14 and the outwardly extending portion 15 in coöperative correspondence to the face 19 of female die 3, 4, whereby the material of the disk 9 and the stem 7 of screw eye 1 are subjected to compressional forces to form the groove 16 ring-portion 17 and the "skirt" portion 18 of the cup-shaped gage or stop collar. The relations of female block 3, 4, and the male block 11 to the disk 9 and screw eye 1 prior to the application of the compressional forces are indicated in Fig. 1.

Upon applying the compressional forces, the face portions 13, 14, and 15 will enter within the opening 8 of male block 3, 4, whereby the groove 16 will be formed at the predetermined location on stem 8 of eye 1 and the ring portion 17 formed on disk 9 protruding within said groove 16. At the same time the "skirt" portion 18 will be formed in accordance with the desired shape of the gage or stop collar. Upon separating the die parts, the completed screw eye illustrated in Fig. 3 will be obtained.

The screw eye 1 and disk 9 may be of brass or other suitable compressible metallic or non-metallic material. The screw eye, screw hook, etc., may be provided with a die thread, if desired. It will be clear that my invention is applicable for drive hooks, eyes, etc.

Whereas I have illustrated my invention by reference to specific illustrations of carrying out my invention, it will be understood that many changes and modifications may be made without departing from the spirit of my invention.

What I claim and desire to secure by Letters Patent is:—

1. The method of producing a hook or like article having a stop collar, which comprises passing an annulus of compressible material onto the stem of said article and positioning said annulus on said stem at a predetermined point by compressional forces to form a groove on said stem at said predetermined point, and a protruding portion on said annulus extending into said groove.

2. The method of producing a hook or like article having a stem integral throughout its length and a stop collar at a predetermined point on said stem, which comprises passing an annulus of compressible material onto said stem of the article and positioning said annulus at the predetermined point by compressional forces acting substantially simultaneously on said collar and said stem to form a groove within and extending substantially completely around said stem, and a protruding portion on said annulus extending into said groove.

3. The method of producing a hook or like article having a stem integral throughout its length and a stop collar positioned at a predetermined point on said stem, which comprises passing a flat annulus of compressible material onto said stem, positioning said annulus at the predetermined point by applying compressional forces substantially simultaneously on said annulus and said stem to form a groove within the body of said stem and extending substantially completely around said stem, and a protruding ring portion on said annulus extending into said groove and shaping said annulus to the form of the purposes desired.

In testimony whereof I have signed this specification in the presence of two subscribing witnesses.

FREDERICK E. WARNER.

Witnesses:
  MARGARET B. LIGHT,
  JAMES J. HILLEGAS.

Copies of this patent may be obtained for five cents each, by addressing the "Commissioner of Patents, Washington, D. C."